United States Patent
Abe et al.

(10) Patent No.: US 9,259,942 B2
(45) Date of Patent: *Feb. 16, 2016

(54) TRANSPORTATION DEVICE AND RECORDING APPARATUS

(71) Applicant: SEIKO EPSON CORPORATION, Tokyo (JP)

(72) Inventors: Takahiro Abe, Shiojiri (JP); Mitsutaka Ide, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/638,827

(22) Filed: Mar. 4, 2015

(65) Prior Publication Data

US 2015/0174922 A1    Jun. 25, 2015

Related U.S. Application Data

(63) Continuation of application No. 14/066,533, filed on Oct. 29, 2013, now Pat. No. 8,998,404.

(30) Foreign Application Priority Data

Oct. 30, 2012  (JP) .................................. 2012-238674

(51) Int. Cl.
*B41J 2/01*       (2006.01)
*B41J 29/393*  (2006.01)
(Continued)

(52) U.S. Cl.
CPC ........... *B41J 11/002* (2013.01); *B65H 23/1806* (2013.01); *G01B 5/00* (2013.01); *G06K 9/00* (2013.01); *G06K 9/209* (2013.01); *B65H 2513/10* (2013.01); *B65H 2513/11* (2013.01);
(Continued)

(58) Field of Classification Search
CPC .... B41J 11/002; G06K 9/209; G06K 2009/21
USPC ............................................... 347/16, 19, 104
See application file for complete search history.

(56) References Cited

U.S. PATENT DOCUMENTS 4,827,283 A    5/1989  Yamamoto et al.
5,168,310 A  12/1992  Hayashi et al.
(Continued)

FOREIGN PATENT DOCUMENTS

JP    2007-217176    8/2007
JP    2008-109251    5/2008
JP    2010-183497    8/2010

OTHER PUBLICATIONS

U.S. Appl. No. 14/066,533, filed Aug. 8, 2014, Office Action.
U.S. Appl. No. 14/066,533, filed Aug. 8, 2014, Notice of Allowance.

*Primary Examiner* — Anh T.N. Vo
(74) *Attorney, Agent, or Firm* — Workman Nydegger

(57) ABSTRACT

A transportation device includes a transportation unit that transports continuous paper, and an image capturing unit that has a light irradiator capable of irradiating the continuous paper which is transported by the transportation unit with light and detects a transportation amount of the continuous paper based on reflected light of the light irradiated onto the continuous paper by the light irradiator. The light irradiator is arranged so as to irradiate the continuous paper with light obliquely with respect to the detection region of the continuous paper from the width direction side of the continuous paper, which is orthogonal to the transportation direction of the continuous paper.

4 Claims, 3 Drawing Sheets

(51) Int. Cl.
*B41J 11/00* (2006.01)
*B65H 23/18* (2006.01)
*G01B 5/00* (2006.01)
*G06K 9/00* (2006.01)
*G06K 9/20* (2006.01)

(52) U.S. Cl.
CPC ......... *B65H 2801/15* (2013.01); *B65H 2801/36* (2013.01); *G06K 2209/19* (2013.01)

(56) References Cited

U.S. PATENT DOCUMENTS

| | | | |
|---|---|---|---|
| 5,384,584 | A | 1/1995 | Yoshida et al. |
| 6,860,665 | B2 * | 3/2005 | Elgee et al. ............ 400/634 |
| 7,104,710 | B2 | 9/2006 | Otsuka |
| 8,619,320 | B2 * | 12/2013 | Watanabe ............ 358/1.5 |
| 8,672,439 | B2 | 3/2014 | Suzuki et al. |

* cited by examiner

TRANSPORTATION DEVICE AND RECORDING APPARATUS

CROSS-REFERENCE TO RELATED APPLICATIONS

This application is a continuation application of U.S. patent application Ser. No. 14/066,533, filed Oct. 29, 2013, which patent application is incorporated herein by reference in its entirety. U.S. patent application Ser. No. 14/066,533 claims the benefit of and priority to Japanese Patent Application No. 2012-238674 filed Oct. 30, 2012, the contents of which are hereby incorporated by reference in its entirety.

BACKGROUND

1. Technical Field

The present invention relates to a transportation device that transports a transportation target material such as paper that is used for printing or the like, for example, and a recording apparatus including the transportation device.

2. Related Art

There has been known an existing ink jet printer that ejects ink onto recording paper (transportation target material) from a recording head (recording unit) so as to form an image, as one type of recording apparatuses (for example, JP-A-2007-217176).

In the printer as disclosed in JP-A-2007-217176, surface character of the recording paper that is transported is captured as continuous images by a camera and captured two adjacent before and after (hereinafter "adjacent") images are compared in the chronological order. Then, movement amounts of a focused pattern in the respective images are figured out and integrated so as to calculate an actual transportation amount of the recording paper.

In this case, images in accordance with relief of the surface of the recording paper illuminated by a light emitting element appear on the two captured images by the camera. Based on this, illuminating an image capturing region by the camera on the surface of the recording paper as even as possible contributes to improvement of calculation accuracy of an actual transportation amount of the recording paper.

Also, there has been known an image forming apparatus (recording apparatus) including an illumination device that is configured to reduce luminance unevenness of a light irradiation surface of a document (transportation target material) that is irradiated with light by the light emitting element such as a light emitting diode (LED) (for example, JP-A-2010-183497). That is to say, in the image forming apparatus as disclosed in JP-A-2010-183497, a plurality of light emitting elements are arranged at both sides of the recording paper that is transported in the sub-scanning direction (transportation direction) of the recording paper such that optical axes thereof are inclined with respect to the sub-scanning direction of the recording paper when seen from the above. With this, the luminance unevenness of the light irradiation surface of the recording paper is made to be reduced.

When the illumination device as disclosed in JP-A-2010-183497 is mounted on the printer as disclosed in JP-A-2007-217176, luminance unevenness of the image capturing region by the camera on the surface of the recording paper is reduced. However, the image capturing region of the recording paper is irradiated with light by the light emitting elements arranged at the transportation direction side of the recording paper. Therefore, a distance between the light emitting elements and the image capturing region is different between adjacent two images that are captured by the camera.

Therefore, an appearing shadow shape based on the relief of the image capturing region on the surface of the recording paper is different between the adjacent two images that are captured by the camera. Due to this, error of the movement amounts of the focused pattern in the respective images is increased, resulting in a problem that the detection accuracy of the actual transportation amount of the recording paper is lowered.

SUMMARY

The invention has been made in view of the problem present in the existing technique. An advantage of some aspects of the invention is to provide a transportation device and a recording apparatus that are capable of improving detection accuracy of a detector for detecting a transportation amount of a transportation target material based on reflected light when a light irradiator irradiates the transportation target material with light.

Hereinafter, described are methods and action effects thereof for solving the above-mentioned problem.

A transportation device according to an aspect of the invention includes a transportation unit that transports a transportation target material, and a detector that has a light irradiator capable of irradiating the transportation target material which is transported by the transportation unit with light and detects a transportation amount of the transportation target material based on reflected light of the light irradiated onto the transportation target material by the light irradiator. In the transportation device, the light irradiator is arranged so as to irradiate the transportation target material with the light obliquely with respect to a surface of the transportation target material from a width direction side of the transportation target material, which is orthogonal to a transportation direction of the transportation target material.

With this configuration, for example, when the light irradiator irradiates a specific detection region on the surface of the transportation target material with light, change of a distance between the detection region on the surface of the transportation target material and the light irradiator is suppressed even during the transportation. Therefore, the light irradiator irradiates the detection region on the surface of the transportation target material with light under substantially the same conditions all the time. Accordingly, detection accuracy of the detector that detects a transportation amount of the transportation target material based on the reflected light of the light irradiated onto the transportation target material by the light irradiator can be improved.

It is preferable that the transportation device according to the above-mentioned aspect of the invention further include a transportation target material supporting portion that has a supporting surface supporting the transportation target material which is transported by the transportation unit and the detector be arranged at a side opposite to the transportation target material with respect to the supporting surface.

With this configuration, when recording processing is performed on the transportation target material supported by the supporting surface, the detector can be prevented from inhibiting the recording processing.

In the transportation device according to the above-mentioned aspect of the invention, it is preferable that the detector include a detection window through which the light passes onto the supporting surface, an end portion of the detection window at a side farther from the light irradiator in an optical axis direction of the light correspond to a first end portion, an end portion of the detection window at a side closer to the light irradiator in the optical axis direction of the light correspond to a second end portion, and the light irradiator be arranged so as to satisfy an equation of $Q_1 \cdot L_2^2 = Q_2 \cdot L_1^2$ when it is assumed that a distance between the light irradiator and the first end portion is $L_1$, a distance between the light irradiator and the second end portion is $L_2$, a light amount of light which is irradiated onto the first end portion by the light irradiator is $Q_1$, and a light amount of light which is irradiated onto the second end portion by the light irradiator is $Q_2$.

With this configuration, the light amount of the light that is irradiated by the light irradiator reduces in inverse proportion to squares of a distance from a light source. Accordingly, the light irradiator is arranged so as to satisfy the equation of $Q_1 \cdot L_2^2 = Q_2 \cdot L_1^2$. This makes it possible to reduce luminance unevenness when the light irradiator irradiates a region corresponding to the detection window on the surface of the transportation target material with light.

In the transportation device according to the above-mentioned aspect of the invention, it is preferable that a plurality of light irradiators be arranged so as to be aligned in parallel along the transportation direction of the transportation target material.

With this configuration, each light irradiator can irradiate the surface of the transportation target material with light stably.

A recording apparatus according to another aspect of the invention includes the transportation device having the above-mentioned configuration and a recording unit that performs recording processing on the transportation target material which is transported by the transportation unit.

With this configuration, action effects same as those obtained by the above-mentioned transportation device can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment in which a recording apparatus is embodied as an ink jet printer is described with reference to the drawings.

Figure 1:
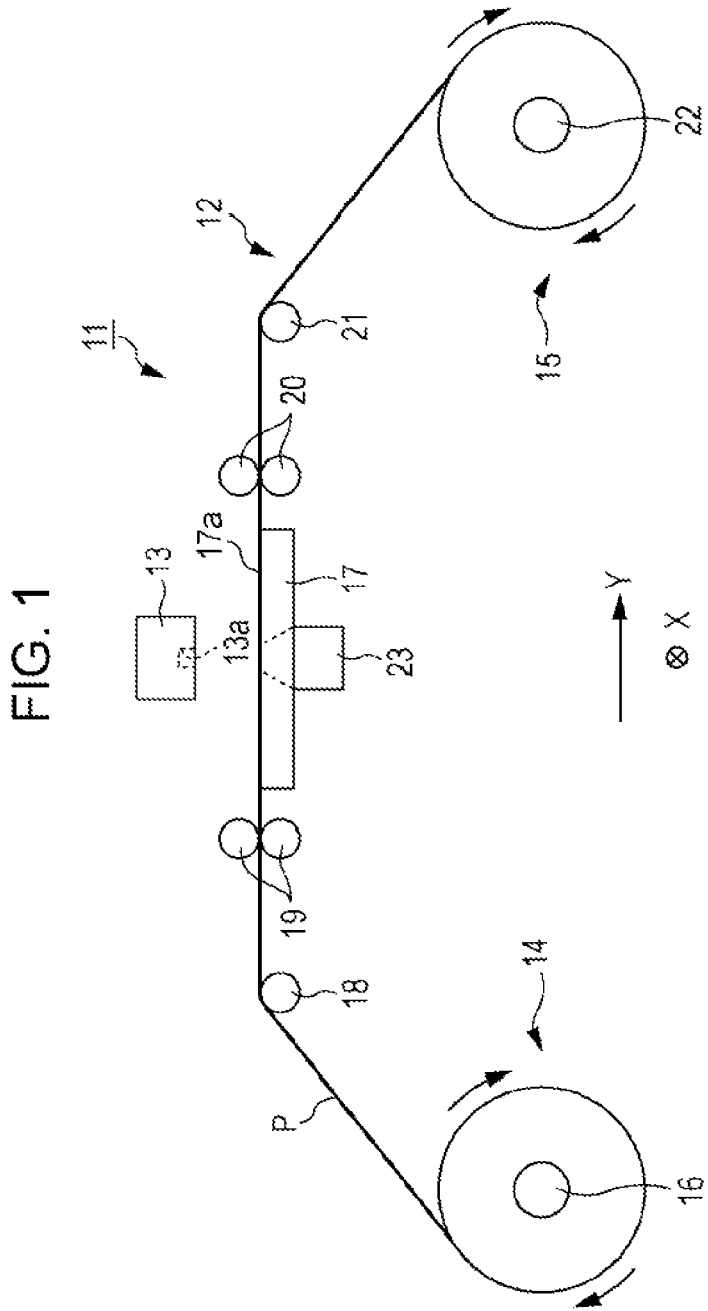
FIG. 1 is a schematic configuration view illustrating an ink jet printer according to an embodiment.

As illustrated in FIG. 1, an ink jet printer 11 as an example of a recording apparatus includes a transportation device 12, and a recording head 13 as an example of a recording unit. The transportation device 12 transports long sheet-like continuous paper P as an example of a transportation target material. The recording head 13 ejects ink (liquid) onto the continuous paper P that is transported by the transportation device 12 and performs printing (recording processing). The transportation device 12 includes a feed-out unit 14 and a winding unit 15. The feed-out unit 14 feeds out the continuous paper P. The winding unit 15 winds up the continuous paper P that has been fed out from the feed-out unit 14 and on which printing has been performed by the recording head 13.

That is to say, in FIG. 1, the feed-out unit 14 is arranged at the left side position at the upstream side in the transportation direction Y of the continuous paper P. The winding unit 15 is arranged at the right side position at the downstream side. The recording head 13 is arranged between the feed-out unit 14 and the winding unit 15 so as to be opposite to a transportation path of the continuous paper P. A plurality of nozzles 13a for ejecting ink onto the transported continuous paper P are formed on the surface of the recording head 13, which is opposite to the transportation path of the continuous paper P.

A rectangular plate-like supporting table 17 as an example of a transportation target material supporting portion is arranged horizontally at a position opposite to the recording head 13 with the transportation path of the continuous paper P interposed therebetween. The supporting table 17 supports a region of the continuous paper P on which printing is performed by the recording head 13. A surface of the supporting table 17, which is opposite to the recording head 13, corresponds to a horizontal supporting surface 17a that supports the continuous paper P.

A feed-out shaft 16 is provided on the feed-out unit 14 in a rotationally driving manner. The feed-out shaft 16 extends in the width direction X (direction orthogonal to a paper surface in FIG. 1) of the continuous paper P, which is orthogonal to the transportation direction Y (right direction in FIG. 1) of the continuous paper P. The continuous paper P is supported by the feed-out shaft 16 so as to be rotatable integrally with the feed-out shaft 16 in a state in which the continuous paper P is wound therearound in a roll form previously. If the feed-out shaft 16 is driven rotationally, the continuous paper P is fed out from the feed-out shaft 16 toward the downstream side of the transportation path.

A first relay roller 18 is arranged at an obliquely upper right position of the feed-out shaft 16 in a rotatable manner. The first relay roller 18 is a roller that winds up the continuous paper P fed out from the feed-out shaft 16 and guides the continuous paper P to the recording head 13 side. A feeding roller pair 19 is arranged at the downstream side of the first relay roller 18 on the transportation path of the continuous paper P. The feeding roller pair 19 is driven rotationally so as to guide the continuous paper P to a position above the supporting table 17 while nipping the continuous paper P that is transported from the first relay roller 18 side.

A discharge roller pair 20 is arranged at the downstream side of the supporting table 17 on the transportation path of the continuous paper P. The discharge roller pair 20 is driven rotationally so as to guide a printed region on the continuous paper P to the downstream side of the transportation path of the continuous paper P from the position above the supporting table 17 while nipping the continuous paper P.

A second relay roller 21 is arranged at the downstream side of the discharge roller pair 20 on the transportation path of the continuous paper P in a rotatable manner. The second relay roller 21 is a roller that winds up the continuous paper P transported from the discharge roller pair 20 side and guides the continuous paper P to the winding unit 15. The winding unit 15 is located at an obliquely lower right position of the second relay roller 21.

A winding shaft 22 is provided on the winding unit 15 in a rotationally driving manner. The winding shaft 22 extends in the width direction X of the continuous paper P, which is orthogonal to the transportation direction Y of the continuous paper P. The winding shaft 22 is driven rotationally so as to wind the printed continuous paper P that is transported from the second relay roller 21 side by the winding shaft 22 sequentially.

An image capturing unit 23 is provided on the supporting table 17. The image capturing unit 23 is an example of a detector for detecting the transportation amount of the continuous paper P in a non-contact manner. The image capturing unit 23 includes a control circuit (not illustrated) that controls the image capturing unit 23 overall.

In the embodiment, the feeding roller pair 19 and the discharge roller pair 20 constitute a transportation unit that transports the continuous paper P.

Next, a configuration of the image capturing unit 23 is described in detail.

Figure 2:
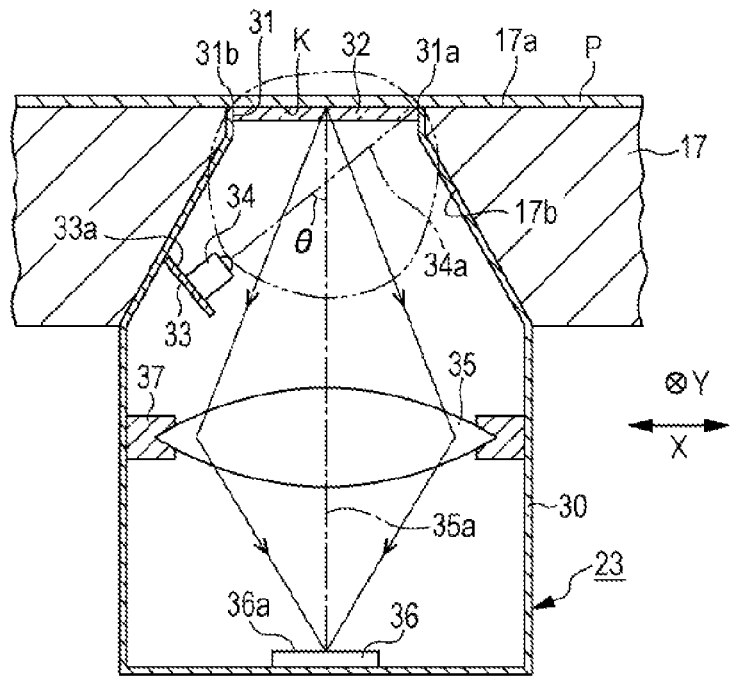
FIG. 2 is a cross-sectional view schematically illustrating an image capturing unit of the printer.

As illustrated in FIG. 2, the image capturing unit 23 includes a case 30 having a square cylindrical shape with a bottom. An upper portion of the case 30 is configured in a tapered manner so as to have a narrower width toward the upper end. The case 30 is fixed to a fixing portion (not illustrated) in a state in which the upper end portion thereof is inserted into a through-hole 17b from the lower side. The through-hole 17b is formed in the supporting table 17. In this case, the upper end of the case 30 is flush with the supporting surface 17a of the supporting table 17.

A rectangular opening of the upper end of the case 30 is formed as a detection window 31 through which light passes. A light-transmissive glass 32 is fitted into the detection window 31. The upper surface of the light-transmissive glass 32 is arranged at a position slightly lower than the supporting surface 17a. That is to say, the light-transmissive glass 32 is arranged so as to be opposite to the continuous paper P that is transported on the supporting surface 17a at the upper and lower sides in a state in which a slight space is interposed therebetween. Accordingly, the light-transmissive glass 32 does not make contact with the continuous paper P.

Figure 4:
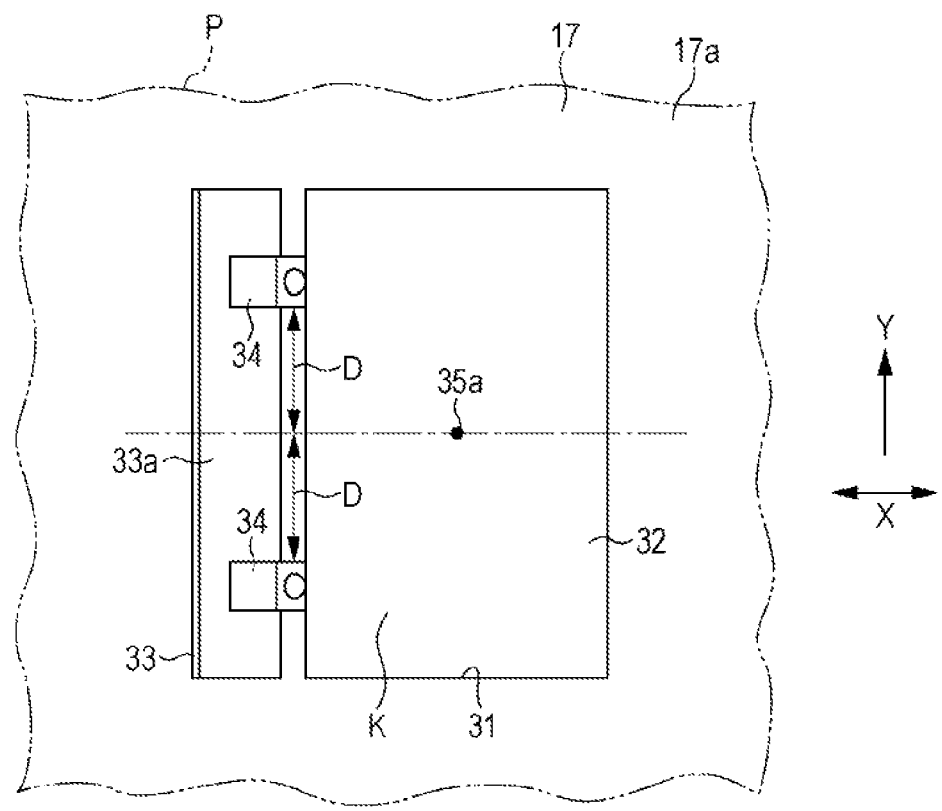
FIG. 4 is a plan view of FIG. 3.

As illustrated in FIG. 2 and FIG. 4, a rectangular supporting plate 33 elongated in the transportation direction Y of the continuous paper P is provided on the inner circumferential surface of the upper portion of the case 30 at one side in the width direction X of the continuous paper P. A pair of light irradiators 34 are attached to an attachment surface 33a of the supporting plate 33, which is the surface at the detection window 31 side. The pair of light irradiators 34 are attached so as to be aligned in parallel in the transportation direction Y of the continuous paper P. Accordingly, it is said that each light irradiator 34 is arranged at the side opposite to the continuous paper P with respect to the supporting surface 17a supporting the continuous paper P.

Figure 3:
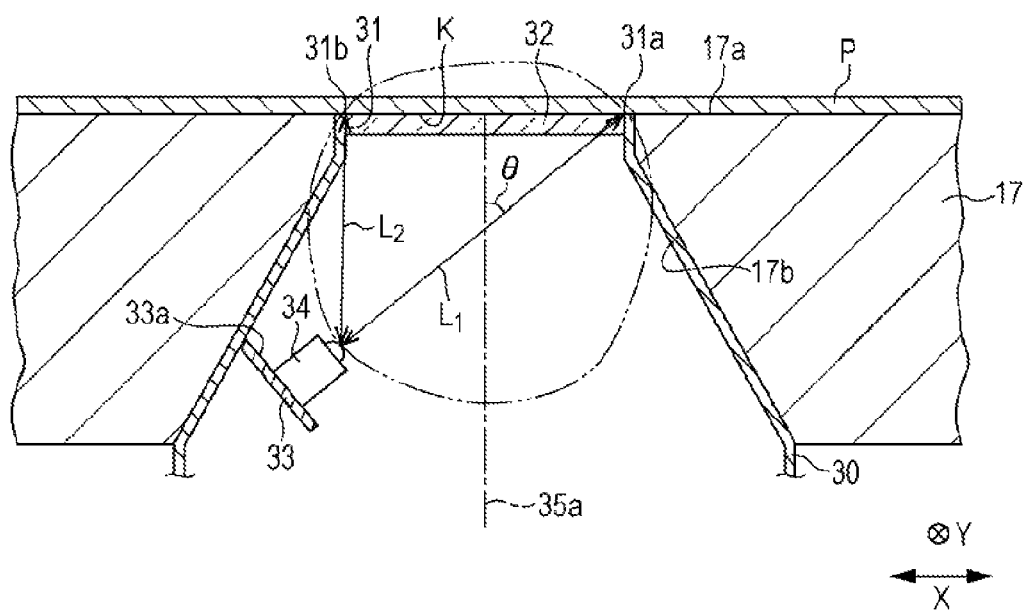
FIG. 3 is a view schematically illustrating a main part of FIG. 2 in an enlarged manner.

As illustrated in FIG. 2 and FIG. 3, each light irradiator 34 is formed with a blue light emitting diode (LED) in the embodiment. Each light irradiator 34 irradiates the continuous paper P that is transported on the supporting surface 17a with light from the lower surface side (non-printing surface side) opposite to the printing surface through the light-transmissive glass 32. In this case, each light irradiator 34 is arranged so as to irradiate the continuous paper P with light with respect to the lower surface (non-printing surface) of the continuous paper P obliquely from the width direction X side orthogonal to the transportation direction Y of the continuous paper P.

Furthermore, in this case, each light irradiator 34 is arranged such that an optical axis 34a as the center of the light irradiated from each light irradiator 34 directs to a first end portion 31a of both end portions of the detection window 31 in the width direction. The first end portion 31a is an end portion of the detection window 31 at the side farther from each light irradiator 34. An end portion of both end portions of the detection window 31 in the width direction at the side closer to each light irradiator 34 corresponds to a second end portion 31b. The width direction X corresponds to the direction that is parallel with the direction when the optical axis direction of the optical axis 34a is seen from the above with reference to a flattened surface of the detection window 31.

A condensing lens 35 is provided in the case 30 at the lower side of the respective light irradiators 34. The condensing lens 35 condenses reflected light. The reflected light is light that has been output from each light irradiator 34, has passed through the light-transmissive glass 32, has been reflected by the lower surface of the continuous paper P, has passed through the light-transmissive glass 32, again, and has been entered into the case 30.

Further, an image capturing element 36 having an image capturing surface 36a is provided in the case 30. An image on the lower surface of the continuous paper P, which has been condensed by the condensing lens 35, is imaged on the image capturing surface 36a. The image capturing element 36 is formed with a two-dimensional image sensor, for example.

The condensing lens 35 is held on the inner circumferential surface of the case 30 through a holding member 37. The condensing lens 35 is held at a height at which the image on the lower surface of the continuous paper P can be imaged on the image capturing surface 36a of the image capturing element 36. In this case, the condensing lens 35 is arranged such that an optical axis 35a thereof passes through the center of the detection window 31 and the center of the image capturing surface 36a.

In general, it is known that the light amount reduces in inverse proportion to squares of a distance from a light source. In the embodiment, arrangement of each light irradiator 34 is determined in the following manner so as to suppress luminance unevenness of light by each light irradiator 34 on a detection region K as a region corresponding to the detection window 31 on the lower surface of the continuous paper P.

That is to say, each light irradiator 34 is arranged so as to satisfy an equation of $Q_1 \cdot L_2^2 = Q_2 \cdot L_1^2$ when it is assumed that a distance between the light irradiator 34 and the first end portion 31a is $L_1$, a distance between the light irradiator 34 and the second end portion 31b is $L_2$, a light amount of light that is irradiated onto the first end portion 31a from the light irradiator 34 is $Q_1$, and a light amount of light that is irradiated onto the second end portion 31b from the light irradiator 34 is $Q_2$.

In other words, an attachment position of the supporting plate 33 to the attachment surface 33a and an angle θ formed by the optical axis 34a of each light irradiator 34 and the optical axis 35a of the condensing lens 35 are determined so as to satisfy the equation of $Q_1 \cdot L_2^2 = Q_2 \cdot L_1^2$ in accordance with orientation characteristics thereof. In this case, as illustrated in FIG. 4, the light irradiators 34 are arranged such that distances D from the optical axis 35a of the condensing lens 35 in the transportation direction Y of the continuous paper P are the same.

The image capturing unit 23 image-captures texture (paper plane pattern) on the lower surface of the continuous paper P that is supported by the supporting table 17 based on the reflected light of the light irradiated onto the continuous paper P by each light irradiator 34 and compares adjacent two images captured at a constant time interval so as to calculate a transportation amount of the continuous paper P per unit time. That is to say, the image capturing unit 23 detects the transportation amount of the continuous paper P based on the reflected light of the light irradiated onto the continuous paper P by each light irradiator 34.

The texture is obtained by planarly grasping a state in which fibers forming paper are entangled from one direction. The texture is easy to be detected when places to be grasped have different patterns or shapes. Therefore, the texture may be patterns given arbitrarily or incidentally when a detection target material (transportation target material) is manufactured or configurations generated from a composition or a structure of a material and the like of the detection target material as long as it can be grasped as characteristics of arbitrary places.

Next, described are actions of the ink jet printer 11 configured as described above by focusing on actions when the image capturing unit 23 detects the transportation amount of the continuous paper P, in particular, below.

As illustrated in FIG. 1, when the continuous paper P is printed, ink is ejected onto the continuous paper P supported by the supporting surface 17a through the nozzles 13a of the recording head 13 while transporting the continuous paper P from the upstream side to the downstream side along the transportation path. In this case, the image capturing unit 23 detects the transportation amount of the continuous paper P supported by the supporting surface 17a in a non-contact manner.

Then, when the image capturing unit 23 detects the transportation amount of the continuous paper P, first, each light irradiator 34 irradiates the detection region K of the texture of the continuous paper P with light through the detection window 31 overall, as illustrated in FIG. 2 and FIG. 3. At this time, the optical axis 34a (center of the light) of each light irradiator 34 is directed to the first end portion 31a from the width direction X side. That is to say, the optical axis 34a of each light irradiator 34, which has the most light amount, is directed to the first end portion 31a at the deepest side (opposite side to each light irradiator 34) in the width direction X of the detection window 31. In addition, each light irradiator 34 is arranged so as to satisfy the equation of $Q_1 \cdot L_2^2 = Q_2 \cdot L_1^2$.

Therefore, luminance unevenness is reduced on the detection region K as the region corresponding to the detection window 31 on the lower surface of the continuous paper P. To be more specific, the luminance unevenness between the detection region K at the first end portion 31a side and the detection region K at the second end portion 31b side is reduced. The luminance unevenness is easy to be generated, in particular, and the light amount of the light which is irradiated by each light irradiator 34 is large on the detection region K at the first end portion 31a side and the detection region K at the first end portion 31a side is farther from each light irradiator 34. The light amount of the light which is irradiated by each light irradiator 34 is small on the detection region K at the second end portion 31b side and the detection region K at the second end portion 31b side is closer to each light irradiator 34. Accordingly, each light irradiator 34 irradiates the detection region K of the continuous paper P with light substantially uniformly.

Furthermore, the texture is a pattern obtained by planarly grasping a three-dimensional structure in which fibers forming the continuous paper P as the detection target material (transportation target material) are entangled, for example. Therefore, shadows of the fibers and the like are generated by irradiating the surface of the continuous paper P and the like with light while inclining the optical axes. With this, contrast is generated between light portions and dark portions and the characteristics of the texture are more emphasized so as to be detected easily.

Then, the light irradiated onto the detection region K of the continuous paper P from each light irradiator 34 is reflected by the detection region K and the reflected light is condensed on the condensing lens 35. With this, an image (texture image) on the detection region K is imaged on the image capturing surface 36a. The image on the detection region K, which has been imaged on the image capturing surface 36a, is image-captured by the image capturing element 36. Then, adjacent two images on the detection region K, which have been image-captured at the constant time interval by the image capturing element 36, are compared. With this, the transportation amount of the continuous paper P per unit time is calculated (detected).

Thus, each light irradiator 34 irradiates the detection region K of the continuous paper P with light substantially evenly in the transportation direction Y of the continuous paper P. Therefore, difference in the shapes of the shadows on the detection region K between the adjacent two images that have been image-captured at the constant time interval are extremely small. Accordingly, the characteristics of the texture are easy to be recognized and the adjacent two images are compared with high accuracy. This improves the detection accuracy of the transportation amount of the continuous paper P based on the movement amount of the texture of the continuous paper P.

Furthermore, the surface of the continuous paper P is irradiated with light while inclining the optical axes. With this, contrast of shadow is generated and the characteristics of the texture can be emphasized. This makes it possible to further enhance detection accuracy of the transportation amount of the continuous paper P.

As described above, the following effects can be obtained with the embodiment described in detail.

1. Each light irradiator 34 is arranged so as to irradiate the continuous paper P with light obliquely with respect to the detection region K on the lower surface of the continuous paper P from the width direction X side. Therefore, change of a distance between the detection region K of the continuous paper P and each light irradiator 34 can be suppressed even during the transportation. Therefore, each light irradiator 34 can irradiate the detection region K of the continuous paper P with light under substantially the same conditions all the time. Accordingly, detection accuracy of the image capturing unit 23 that detects the transportation amount of the continuous paper P based on the reflected light of the light irradiated onto the continuous paper P by each light irradiator 34 can be improved.

2. The image capturing unit 23 is arranged at the side opposite to the continuous paper P with respect to the supporting surface 17a, that is, at the side opposite to the continuous paper P with respect to the recording head 13. Therefore, when ink is ejected onto the continuous paper P supported on the supporting surface 17a through the nozzles 13a of the recording head 13, the image capturing unit 23 can be prevented from inhibiting the recording processing.

3. In general, the light amount of the light irradiated by each light irradiator 34 reduces in inverse proportion to squares of a distance from each light irradiator 34. Alternatively, in the embodiment, each light irradiator 34 is arranged so as to satisfy the equation of $Q_1 \cdot L_2^2 = Q_2 \cdot L_1^2$. With this, luminance unevenness can be reduced on the detection region K of the continuous paper P. To be more specific, the luminance unevenness between the detection region K at the first end portion 31a side and the detection region K at the second end portion 31b side can be reduced. The luminance unevenness is easy to be generated, in particular, and the light amount of the light which is irradiated by each light irradiator 34 is large on the detection region K at the first end portion 31a side and the detection region K at the first end portion 31a side is farther from each light irradiator 34. The light amount of the light which is irradiated by each light irradiator 34 is small on the detection region K at the second end portion 31b side and the detection region K at the second end portion 31b side is closer to each light irradiator 34. Accordingly, each light irradiator 34 irradiates the detection region K of the continuous paper P with light substantially uniformly.

4. The two light irradiators 34 are arranged so as to be aligned in parallel in the transportation direction Y of the continuous paper P. This makes it possible to irradiate the detection region K of the continuous paper P with light stably.

Modifications

The above-mentioned embodiment may be changed as follows.

Each light irradiator 34 is not necessarily arranged so as to satisfy the equation of $Q_1 \cdot L_2^2 = Q_2 \cdot L_1^2$.

The image capturing unit 23 may be arranged at the same side as the continuous paper P with respect to the supporting surface 17a.

A single light irradiator 34 may be arranged or equal to or more than three light irradiators 34 may be arranged along the transportation direction Y of the continuous paper P.

Equal to or more than two condensing lenses 35 may be arranged in the image capturing unit 23.

The transportation target material is not limited to the continuous paper P and may be a cut paper.

The transportation target material may be a fabric, a plastic film, a metal foil, or the like as long as it has texture on the surface thereof.

The ink jet printer 11 may be a serial printer or a line printer.

In the above-mentioned embodiment, the recording apparatus may be fluid ejecting apparatuses that eject and discharge fluids (including liquids, liquid-like materials obtained by dispersing or mixing particles of a functional material in liquid, fluid-like materials such as gel (including solids which can be made to flow and ejected as fluids)) other than ink so as to perform recording. For example, the recording apparatus may be liquid-like material ejecting apparatuses that eject liquid-like materials containing electrode materials or colorants (pixel materials) to be used for manufacturing liquid crystal displays, electroluminescent (EL) displays, or surface emitting displays in a form of dispersion or solution so as to perform recording. Further, the recording apparatus may be fluid-like material ejecting apparatuses that eject fluid-like materials such as gel (for example, physical gel) or powder and granular material ejecting apparatuses (for example, toner jet recording apparatus) that eject solids exemplified by powder materials (powder and granular materials) such as toner. The invention can be applied to any one of the fluid ejecting apparatuses. It is to be noted that the terminology "fluid" in the specification does not encompass fluids containing gas only conceptually. The fluids include liquids (inorganic solvents, organic solvents, solution, liquid-like resins, and liquid-like metals (metal melt), for example), liquid-like materials, fluid-like materials, powder and granular materials (including granular materials and powder materials) and the like.

The transportation device is not limited to the one included in the recording apparatus that performs recording processing on the transportation target material and may be included in various types of processing devices that perform arbitrary processing on the transportation target material.

What is claimed is:

1. A transportation device comprising:
   a transportation unit that transports a transportation target material;
   a transportation target material supporting portion that has a supporting surface supporting the transportation target material which is transported by the transportation unit;
   a light irradiator that is capable of irradiating the transportation target material which is transported by the transportation unit with light; and
   a detector that detects a transportation amount of the transportation target material based on reflected light of the light irradiated onto the transportation target material by the light irradiator, wherein
   a plurality of light irradiators are arranged so as to be aligned in parallel along a transportation direction of the transportation target material, and
   the detector is arranged at the transportation target material supporting portion.

2. The transportation device according to claim 1, wherein the detector includes a detection window through which the light passes the supporting surface.

3. The transportation device according to claim 1, wherein
   an end portion of the detection window at a side farther from the light irradiator in an optical axis direction of the light corresponds to a first end portion,
   an end portion of the detection window at a side closer to the light irradiator in the optical axis direction of the light corresponds to a second end portion, and
   the light irradiator is arranged so as to satisfy an equation of $Q_1 \cdot L_{22} = Q_2 \cdot L_{12}$ when it is assumed that a distance between the light irradiator and the first end portion is $L_1$, a distance between the light irradiator and the second end portion is $L_2$, a light amount of light which is irradiated onto the first end portion by the light irradiator is $Q_1$, and a light amount of light which is irradiated onto the second end portion by the light irradiator is $Q_2$.

4. A recording apparatus comprising:
   a transportation device comprising: a transportation unit that transports a transportation target material; a transportation target material supporting portion that has a supporting surface supporting the transportation target material which is transported by the transportation unit; a light irradiator that is capable of irradiating the transportation target material which is transported by the transportation unit with light; and a detector that detects a transportation amount of the transportation target material based on reflected light of the light irradiated onto the transportation target material by the light irradiator, wherein a plurality of light irradiators are arranged so as to be aligned in parallel along a transportation direction of the transportation target material, and the detector is arranged at the transportation target material supporting portion; and
   a recording unit that performs recording processing on the transportation target material which is transported by the transportation unit.

* * * * *